United States Patent [19]

Beshty et al.

[11] Patent Number: 4,670,359

[45] Date of Patent: Jun. 2, 1987

[54] FUEL CELL INTEGRATED WITH STEAM REFORMER

[75] Inventors: Bahjat S. Beshty, Lower Makefield, Pa.; James A. Whelan, Bricktown, N.J.

[73] Assignee: Engelhard Corporation, Menlo Park, N.J.

[21] Appl. No.: 743,714

[22] Filed: Jun. 10, 1985

[51] Int. Cl.⁴ .............................................. H01M 8/06
[52] U.S. Cl. ...................................... 429/17; 429/20; 429/26; 429/40
[58] Field of Search ..................... 429/20, 26, 19, 17, 429/40; 423/650

[56] References Cited

U.S. PATENT DOCUMENTS

| | | | |
|---|---|---|---|
| 3,469,944 | 9/1969 | Bocard et al. | 423/650 |
| 4,352,863 | 10/1982 | Maru | 429/20 X |
| 4,391,794 | 7/1983 | Silberring | 429/650 |
| 4,473,622 | 9/1984 | Chludzinski et al. | 429/26 X |
| 4,537,839 | 8/1985 | Cameron | 429/20 |

Primary Examiner—Anthony Skapars

[57] ABSTRACT

A $H_2$-air fuel cell integrated with a steam reformer is disclosed wherein a superheated water/methanol mixture is fed to a catalytic reformer to provide a continuous supply of hydrogen to the fuel cell, the gases exhausted from the anode of the fuel cell providing the thermal energy, via combustion, for superheating the water/methanol mixture.

17 Claims, 2 Drawing Figures

FUEL CELL INTEGRATED WITH STEAM REFORMER

BACKGROUND OF THE INVENTION

1. Field of the Invention

This invention relates to a fuel cell system integrated to utilize hydrogen produced by steam reforming of methanol.

2. The Prior Art

Fuel cells generate electricity through galvanic combustion of fuel process gas with oxidant process gas. Typically oxidant gas can be obtained from the fuel cell environment with little, if any, processing. The fuel process gas, on the other hand, is usually hydrogen and its generation requires processing of other fuels such as methanol. Direct oxidation of fuels such as methanol in fuel cells at practical current densities with acceptable catalyst loadings is not as economically attractive as conversion of methanol fuel to a hydrogen-rich mixture of gases via steam reforming and subsequent electrochemical conversion of the hydrogen-rich fuel stream to direct current in the fuel cell.

A very attractive fuel cell system currently undergoing commercial consideration is the reformed methanol fuel-phosphoric acid electrolyte-air system. Primary advantages of phosphoric acid electrolyte (85 wt. %) include ability to operate with fuel and ambient air containing $CO_2$, ability to operate with a thin matrix electolyte (no liquid circulation) and chemical stability of the electrolyte over the operating temperature of the cell, e.g. 180°–200° C.

The fuel cell itself is only part of the overall system, and other components of the system, e.g., generation of hydrogen fuel, are likewise important in terms of overall system size and cost effectiveness.

In one method used by the art to produce hydrogen by steam reforming, a methanol and steam feedback is passed through catalyst filled tubes disposed within a reactor or reformer. Fuel and air are combusted outside of the tubes in the reformer to provide heat for the endothermic catalytic reaction taking place within the tubes at about 300° C. In this process, the mixture of methanol and steam is converted to a gaseous stream consisting primarily of hydrogen (about 68%) and $CO_2$ (about 21.7%), Co (about 1.5%) and $H_2O$ (about 8.8%). In order to improve the thermal efficiency of such apparatus, efforts have been directed to improve the uniformity of heat distribution in the tubes within the reactor while minimizing the amount of energy used to produce each unit of hydrogen containing gas.

For the most efficient operation of the steam reforming reaction, large surface areas are required to transfer the heat from the combusted gases to the tubes. In reformers presently used for steam reforming, small diameter reaction tubes are clustered closely together in the furnace so that heat transfer from the combusting gases in the reactor into the catalyst packed tubes is optimized.

The use of a plurality of tubes to accomplish heat transfer contributes to the large size and high cost of the reformer. A second drawback to such reformers is that the heat for the steam reforming process is provided indirectly by means of heat transfer through tube walls. This inefficient heat transfer has a detrimental effect in fuel cell systems in which the reformer and the fuel cell are fully integrated, i.e. the combustion gases for the reforming reaction are derived from the fuel cell exhaust. Thus, at the inlet of the reformer, it is impossible, because of the highly endothermic nature of the reaction, to supply enough heat to the surface area of the reformer tubes so there tends to be a large decrease in reactant temperature in the area adjacent the inlet. A large portion of each reactor tube, as a result operates at an undesirably low reaction temperature. The resultant effect of the fuel cell system is that, in order to effect complete methanol conversion, the reformer must necessarily be of a large size and concomittant high cost.

In copending patent application Ser. No. 743,204 filed of even date herewith, the production of hydrogen by the steam reforming of methanol is accomplished in a reformer of substantially reduced size by superheating a gaseous mixture of water and methanol at a temperature of about 800° to about 1100° F. and then feeding the superheated gaseous mixture to a reformer in contact with the catalyst bed contained therein, whereby at least a major portion of the heat for the endothermic steam reforming reaction is provided directly by the sensible heat in the superheated steam/methanol stream.

As a result of direct heating of the reformer feed gases augmenting indirect heat transfer through the wall of the reactor, a shell-and-multiple tube reactor arrangement or other means of increasing the heat transfer surface is not always required and the complexity and overall volume of the reformer can be substantially reduced. This invention is based upon the realization that an efficient practical integrated reformer-fuel cell system and process can be achieved by using a superheater, an essentially adiabatic methanol reformer and a fuel cell wherein the various exhaust streams from the components are utilized with other components of the system. In this system, the water to methanol ratio and temperature of the stream leaving the superheater are of such values that substantially all (at least about 75%, preferably 90%) of the heat required for the endothermic reforming reaction is contained within the reaction stream itself and, at most, only a small portion of the heat required for reforming is supplied through the wall of the reforming reactor. In addition to the reformer size reduction achieved by the use of the process disclosed in copending U.S. Ser. No. 743,204, a further reduction in reactor size is achieved by use of an essentially adiabatic reactor. This invention is also based on the realization that it is highly advantageous to integrate the steam reforming process disclosed in copending U.S. Ser. No. 743,204 with a fuel cell to form a fuel cell system whereby a continuous supply of hydrogen could be provided to the fuel cell from an essentially adiabatic steam reformer, the gases exhausted from the anode of the fuel cell providing thermal energy via combustion for superheating the water/methanol mixture.

It is therefore a primary object of the present invention to efficiently integrate a fuel cell with the steam reforming process to provide a thermochemical process for producing electrical energy in which the heat required for the endothermic reforming reaction is contained substantially completely within the stream fed to the reformer which produces hydrogen for a fuel cell so that a compact and efficient system may be obtained.

The above object of the invention is achieved in accordance with the fuel cell system of the present invention comprised of a heat exchanger, a burner, an adiabatic steam reformer and a fuel cell wherein a superheated mixture of water and methanol is first converted by an essentially adiabatic endothermic catalytic reforming reaction to hydrogen. The hydrogen, generated in the reformer, is directed to the fuel electrode of the fuel cell, and air is directed to the oxygen electrode to effect an electrochemical reaction to produce electricity and gaseous reaction products. A portion of the exhaust gases from the fuel electrode is combustible as it contains unreacted hydrogen. Furthermore, it is desirable to withdraw this portion of gas from the fuel cell to maintain a hydrogen-rich stream in the fuel cell thus optimizing fuel cell operation in accordance with the present state of the fuel cell art. The combustible gas exhausted from the fuel electrode is burned in the burner, the exhaust of which is fed to the heat exchanger to supply heat for superheating the water/methanol mixture fed to the reformer. Even though large amounts of water are used in the system and thus more heat is required to vaporize and preheat these methanol water mixtures containing large amounts of water, the heat generated can be effectively recovered and used in the system and process of the present invention. Further, parasitic power requirements are decreased, and the low concentration of carbon monoxide in the reformate should lead to improved fuel cell efficiency and extended fuel cell life, so the net methanol demand remains essentially constant or may decrease slightly (around 20%). Thus, the net energy production is at least substantially equivalent to that obtained using mixtures containing lesser amounts of water.

DETAILED DESCRIPTION OF THE INVENTION

Having set forth its general nature, the invention will best be understood from the subsequent more detailed description wherein reference will be made to the accompanying drawings which illustrate systems suitable for practicing the present invention.

Figure 1:
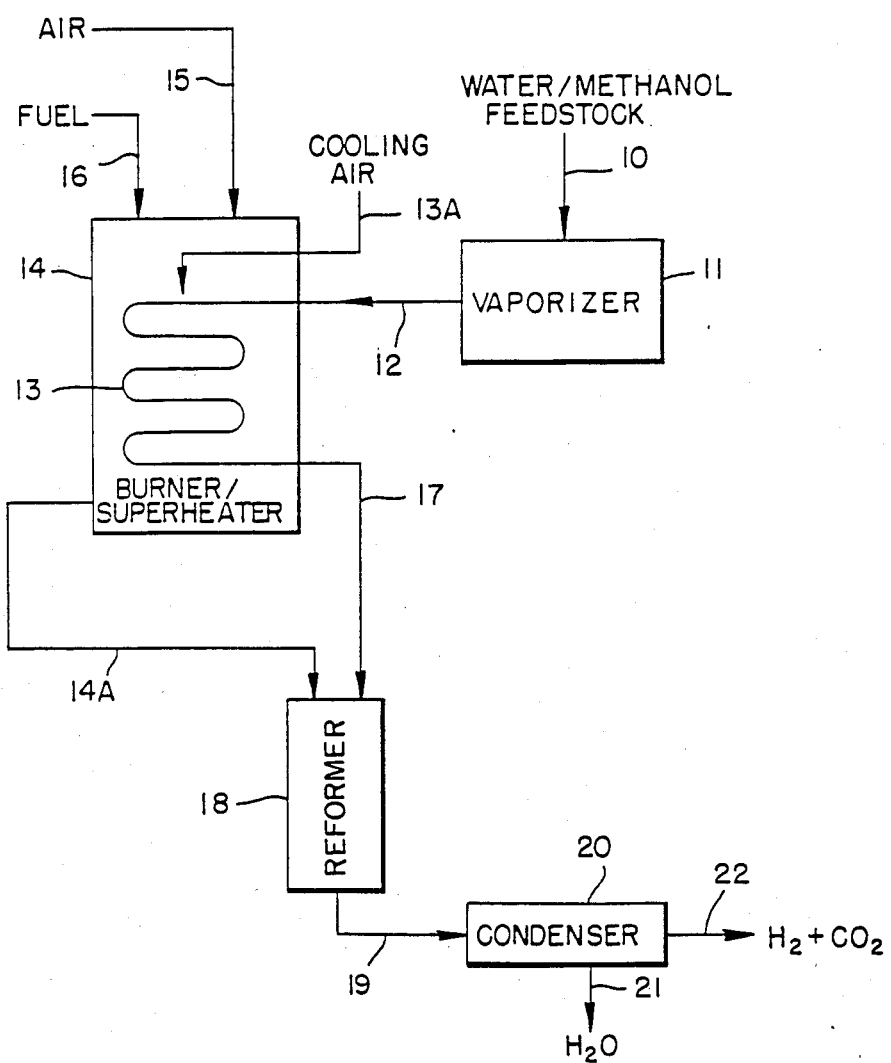

Reference is now made to FIG. 1 of the drawings which schematically illustrates a flow scheme in accordance with this invention of the steam reforming of methanol for the production of hydrogen therefrom. As illustrated in FIG. 1, a water and methanol feedstock having a water/methanol mole ratio ranging from about 1.0 to about 10.0, preferably about 2.0 to about 9.0, and more preferably about 2.5 to about 4.0, is supplied via conduit 10 to vaporizer 11 wherein the water/methanol feed supplied thereto is heated to a temperature of about 200° to about 500° F. to convert the feedstock into a gaseous mixture. The hot gaseous steam/methanol stream then exits the vaporizer via line 12 and is supplied to superheater coil 13 contained in burner 14. The gaseous mixture contained in coil 13 is superheated to a temperature of about 700° to about 1100° F., and preferably about 850° F. to about 1000° F., the fuel for heating the mixture being supplied to burner 14 via conduit 16 together with an oxidizing gas such as air or another oxygen containing gas via conduit 15. When the reforming system is integrated with a fuel cell, the fuel burned in the burner 13 includes unreacted hydrogen gas exhausted from the anode side of the fuel cell which undergoes combustion with an oxidizing gas such as air or oxygen. The temperature and composition of the methanol/steam mixture leaving the superheater are such that at most only minimal additional heat will be required to obtain essentially complete conversion of the methanol contained therein. Table I sets forth the variation in weight hourly space velocity (and thereby reactor size) obtained by varying the methanol/water mole ratio of 4.5 to 9.0.

TABLE I

| WHSV | H$_2$O/ MeOH | Reformer Inlet Temp. | % Conversion | Projected WHSV* for 99.8% Methanol Conversion |
|---|---|---|---|---|
| 1.5 | 4.5 | 900° F. | 84.6% | 0.45 |
| 1.5 | 9.0 | 900° F. | 96.2% | 0.789 |

*Weight hourly space velocity in units of gm methanol feed/gm catalyst/hr.

For purposes of the present invention, H$_2$O to MeOH mole ratios of from about 2.5 to about 4.5 are preferred at temperatures of from about 900° to about 1100° F.

Gases resulting from the combustion reaction may exit burner 14 via line 14A to reformer 18 in contact with the outside of the catalyst bed. This would provide some additional heat to the reforming reaction and prevent heat loss from reactor 18, thereby reducing the size of reactor 18. In view of the fact that substantially all of the heat for the reforming reaction is supplied by preheating of the reformer feed gases, reformer 18 can be constructed in the form of a single tube having a length to diameter (aspect) ratio of less than 10:1, preferably less than 8:1, more preferably less than 6:1, most preferably from about 2:1 to about 6:1. The superheated steam/methanol gaseous mixture exits superheater coil 13 at a temperature of 850° to 1000° F. and a pressure of 14.7 to 150 psia via line 17 and is supplied to reformer 18 at the desired superheated temperature and pressure.

The superheated steam/methanol gaseous mixture is reformed as it passes through a tube packed with a suitable catalyst (not shown) contained in reformer 18. The steam reforming catalyst is typically a metal or metal oxide supported on an inert ceramic material. For example, a suitable steam reforming catalyst is zinc oxide (e.g. about 30 to 65% by weight zinc)/chromium oxide (about 5 to 35% by weight chromium) or a zinc oxide (about 5 to 20% by weight zinc)/copper oxide (about 15 to 40% by weight copper) combination supported on alumina (about 15 to 50% by weight).

It has been determined that steam reforming in accordance with the practice of the present invention is optimized and heating is accomplished more readily when the reformer tube is divided into two catalyst sections, i.e. a first section from the inlet to the reactor tube to an intermediate position in the reactor tube containing a catalyst which has relatively low activity but good resistance to high temperatures, such as zinc/chromium oxides and a second section extending from the end of the first section to the outlet area of the reactor tube containing a high activity catalyst such as copper/zinc oxides. Alternatively, the low activity, high temperature resistant catalyst may be used by itself.

In order to accommodate the endothermicity of the reforming reaction, heat is provided to reformer 18 as the sensible heat contained in the superheated gases. Thus, when methanol vapors and steam contact a catalyst such as a combination of zinc oxide and copper oxide at 500° to 900° F. at atmospheric or higher pressure, methanol in effect decomposes to carbon monoxide and hydrogen while the carbon monoxide and steam correspondingly react according to the well known water gas shift reaction to form carbon dioxide and hydrogen as set forth below:

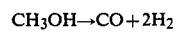

$CH_3OH \rightarrow CO + 2H_2$

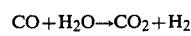

$CO + H_2O \rightarrow CO_2 + H_2$ so that the overall reaction taking place in reformer 18 is:

$$CH_3OH + H_2O \rightarrow CO_2 + 3H_2$$

Thus, within reformer 18, methanol and steam react endothermically at high temperature to produce a gaseous product consisting primarily of steam, hydrogen and carbon dioxide which is recovered from reactor 18 and supplied via conduit 19 either to condenser means 20, wherein most of the water is removed from the gaseous hydrogen/carbon dioxide mixture by cooling the gaseous mixture to condense the water or directly via line 19a to the fuel cell. Where condensing means are used, water exits condenser 20 via line 21 and a gaseous mixture of hydrogen and carbon dioxide exits condenser 20 via line 22 and in this state may be supplied for direct utilization at the fuel side or anode of a fuel cell. If desired, the hydrogen/carbon dioxide mixture may be further fractionated, by means not shown, to recover separated quantities of hydrogen and carbon dioxide.

The introduction of superheated steam and methanol of the preferred temperatures and compositions into the catalyst bed in the reforming system, illustrated in FIG. 1, permits the reforming apparatus to be made more compact, at least substantially narrower and with fewer reaction tubes than an apparatus relying on a standard feed of water and methanol which would require a large number of reaction tubes for producing an equivalent reforming effect. For many applications, the reformer can, if desired, be constructed in the form of a single tube. In a typical hydrogen production process using the reforming system illustrated in FIG. 1, methanol is passed with steam over a catalyst at pressure typically ranging from 14.7 to 150 psia and temperatures in the range of about 850° to about 1000° F. Typical steam to methanol mole ratios ($H_2O$/carbon) are in the range of about 2.5:1 to about 4:1. The conversion of methanol may be effected in one pass over the catalyst bed contained in the reformer.

FIG. 1 as described above, schematically shows small scale equipment for carrying out the methanol steam reforming process of the present invention. The foregoing principles are readily applicable to the design of large scale equipment for the production of hydrogen in accordance with well known techniques.

Figure 2:
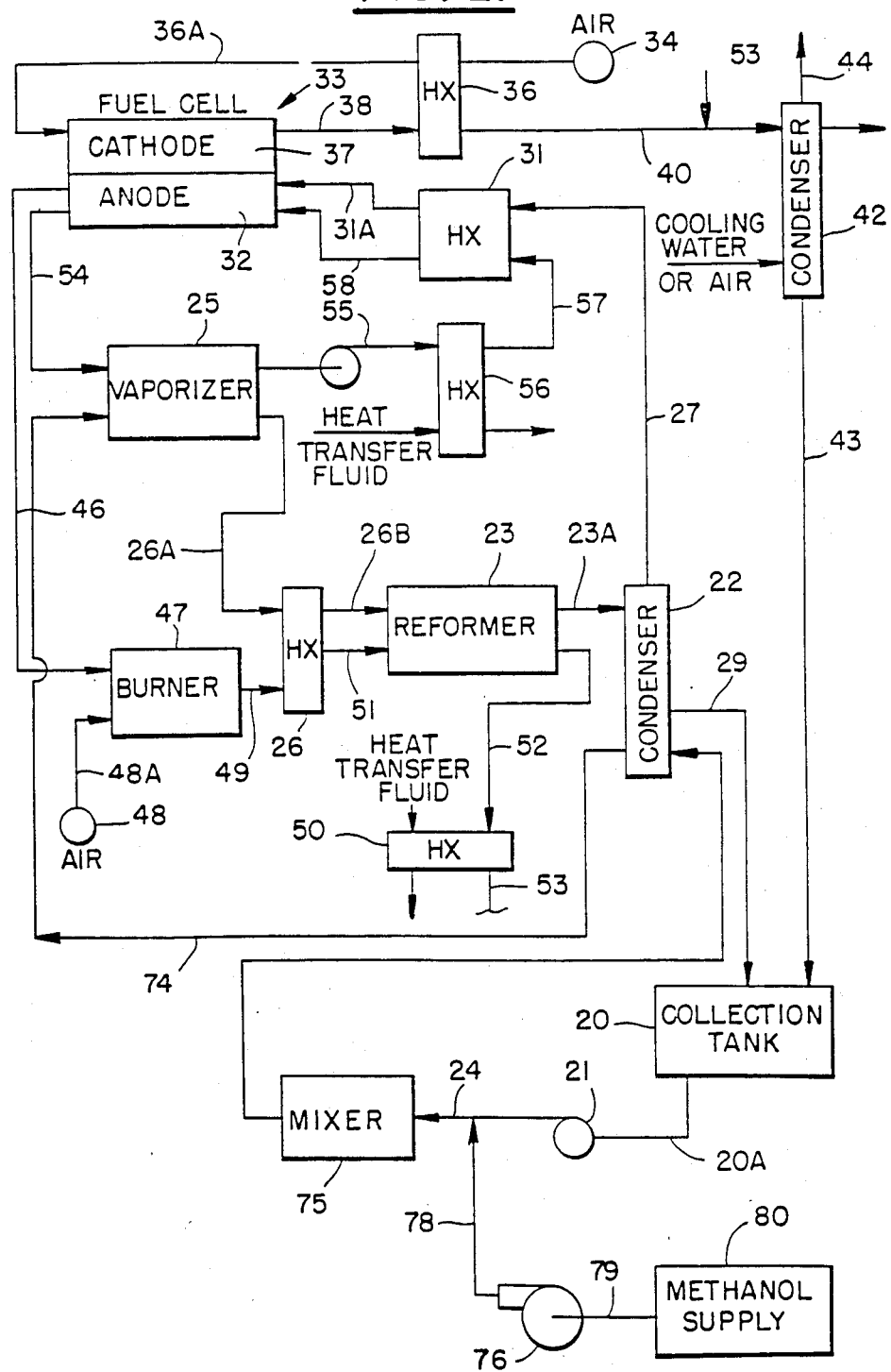

The system shown in FIG. 1 for steam reforming methanol into hydrogen is particularly adapted for use in, and can be efficiently integrated with, a fuel cell system. FIG. 2 shows one embodiment of a method and means for efficiently integrating a fuel cell with the reforming system illustrated in FIG. 1. FIG. 2 is a schematic diagram of a system which includes a methanol reformer integrated with a phosphoric acid electrolyte fuel cell.

Referring now to FIG. 2, in operation, water from collection tank 20 at less than 200° F., e.g. about 135° F., is introduced by way of charge line 20A to pump 21 and pressurized to 1–10 atmospheres (14.7 to 150 psia). Methanol feed from methanol supply 80 is fed via line 79 to pump 76 which pressurizes the methanol to 1 to 10 atmospheres (14.7 to 150 psia) and delivers it via line 78 to mix with the water feed (line 24 and mixer 75). The pressurized mixture is then pumped through condenser 22 where it is used to cool hot (e.g. 520° F.) steam reformate exhausted from reformer 23. The temperature of the gaseous effluent from reformer 23 is adjusted to from about 135° to about 150° F. by heat exchange with the feedstock and, correspondingly, the temperature of the feedstock is raised to about 235° F. The preheated feedstock is passed to vaporizer 25 via line 74. At vaporizer 25 the water/methanol feedstock is vaporized completely and heated to about 350° F. The vaporized feedstock is directed through heat exchanger 26 via conduit 26A where it is superheated to about 900° F. The superheated feedstock is supplied to the inlet portion of reformer 23 via conduit 26B and into contact with a catalyst bed (not shown) contained within reformer 23. The superheated steam/methanol feedstock contains sufficient sensible heat to effect the endothermic hydrogen producing reforming reaction within reformer 23 without a substantial external heat source and there is produced a raw gaseous effluent stream having the following approximate composition in mole %: $H_2$ 23.0 to 60.0, $CO_2$ 7.6 to 20.0, CO 0.0035 to 2.0 and $H_2O$ 20.0 to 70.0.

The hot (e.g. 520° F.) product gas stream exiting reformer 23 is passed through line 23A and into condenser 22 where it is cooled to a temperature in the range of about 135° to about 150° F. to condense much of its water content by heat exchange with the as yet unreformed water/methanol feedstock being circulated through the condenser 22 on its way to the vaporizer 25, as previously described. The cooled reformate is passed from condenser 22 via valved conduit 27 to heat exchanger 31. Water separated out in condenser 22 is passed into collection tank 20 via conduit 29 to provide some of the water for the methanol/water reforming reaction. In heat exchanger 31, the hydrogen containing effluent is heated to about 315° F. by the fuel cell liquid coolant. The heated effluent is then directed via conduit 31A to anode compartment 32 of fuel cell 33. Ambient air is passed from a suitable source 34 through heat exchanger 36, heated to about 275° F. therein and passes into the cathode compartment 37 of the fuel cell 33 via conduit 36A.

The hot (e.g., 375° F.) exhaust gases from the cathode compartment 37 are routed via conduit 38 to heat exchanger 36 to preheat the incoming air to the cathode compartment 37 from the air source 34 and by passage through the heat exchanger are cooled to 209° F. The cathode exhaust includes oxygen from the air which was not consumed by the fuel cell as well as a considerable amount of water which was produced in the fuel cell at the cathode. The cooled cathode exhaust containing a large concentration of water vapor is routed via conduit 40 to condenser 42 to separate the gaseous cathode effluent constituents (e.g. $O_2$, $N_2$) from the water in the cathode exhaust, which water is condensed and routed via conduit 43 to be recycled for use in collection tank 20. The gaseous cathode effluents separated from the water condensed in condenser 42 are vented to the atmosphere through gas outlet 44 in the condenser 42.

The gaseous exhaust from anode compartment 32 of fuel cell 33 is routed via conduit 46 to burner 47. The anode exhaust, which is at a temperature of 350° to 400° F., contains some hydrogen which has not been consumed by the fuel cell, as well as carbon dioxide and water. Ambient air enters burner 47 via conduit 48A. The anode exhaust and air admitted to burner 47 mixes and burns in burner 47. The burner combustion products, including the water (in the form of steam), leave burner 47 via conduit 49 and are passed through heat exchanger 26 to supply heat to superheat the water/methanol feedstock already vaporized in vaporizer 25. The cooled burner exhaust from heat exchanger 26 is passed to reformer 23 via conduit 51 to provide additional heat while retarding reformer heat loss and then routed via conduit 52 to heat exchanger 50. After further cooling in heat exchanger 50, the burner exhaust gases are routed via conduit 53 to condenser 42 for recovery of water which is routed to mix tank 20 for use in the reformer feedstock.

Heat transfer fluid (e.g. a mineral oil type) is circulated through fuel cell 33 to maintain the desired operating temperature, namely 335°–400° F. Heat transfer fluid, e.g. at a temperature of about 345° F., exhausted from the fuel cell 33 is routed to vaporizer 25 via conduit 54. At vaporizer 25, the heat transfer fluid is cooled and the feedstock is vaporized and preheated therein to about 335° F. prior to being superheated to 900° F. in heat exchanger 26. The amount of heat required for vaporization and preheating of the feedstock is sufficient to produce about a 5° F. drop in the temperature of the heat transfer fluid from the fuel cell, i.e. from 345° F. (the temperature at the fuel cell exit) to 340° F. Typically, the heat transfer fluid circulated through vaporizer 25 is further cooled by being pumped through heat exchanger 56 by pump 55 prior to its passage to heat exchanger 31 via conduit 57 and its ultimate return to fuel cell 33 via conduit 58.

From the above description of suitable means for conducting the method of the present invention, it will be clear that various alternatives exist for maintaining the heat balance during the practice of the reforming process of the present invention when integrated with a phosphoric acid fuel cell system of the type hereinbefore described. The selection of a particular mode of operation will be dictated by overall process economics prevalent with any particular $H_2$-air fuel cell system and the desire to maximize the production of gaseous hydrogen while operating under the most beneficial conditions of temperature and pressure.

The following examples are offered for a better understanding of the reforming process of the present invention, but the invention is not to be construed as limited thereto.

EXAMPLE I

A mixture of air and hydrogen was separately fed to a burner equipped with a heating coil of the type shown in FIG. 1 of the drawings. In separate runs, a water/methanol feedstock at molar feed ratios of 4.5 and 9.0 was preheated to a temperature of 900° F. in a mineral oil heated vaporizer 11. The preheated water/methanol feedstock was passed into heating coil 13 of burner 14 and superheated to 900° F. The water/methanol feedstock exited the burner at 900° F. and was passed into the inlet section of experimental subscale reformer 18 which consisted of a one-inch diameter pipe with a one foot long catalyst bed consisting of 206 grams of a ZnO/CuO combination catalyst on an alumina support. The composition of the catalyst of the type conventionally used for the water gas shift reaction comprised of 11.6% by weight Zn, 27.5% by weight Cu, and 29.9% by weight alumina. Reforming of the methanol in reformer 18 was accomplished at 14.7 psia and a constant weight hourly space velocity of 1.5 grams (gm) methanol feed/gm catalyst/hour. Steam reforming took place within the catalyst bed with the heat being provided directly thereto by the superheated gases flowing through reformer 18.

In both runs, effluent samples collected from condenser 20 and analyzed for CO content using a gas chromatograph indicated that the carbon monoxide level was below the calibration range of the gas chromatograph (100–200 ppm).

The methanol conversion for the 4.5 and 9.0 water/molar feed ratios in the two runs was 84.6 and 96.2% respectively. The first order rate constants overall were 2.8 and 4.9 $hr^{-1}$ respectively. The projected weight hourly space velocities for the 4.5 and 9.0 water/molar feed ratios in the two runs to yield 99.8% methanol conversion was calculated to be 0.45 and 0.789 gm methanol feed/gm catalyst/hour respectively.

The temperature profile through the length of the reformer is shown in Table II below.

TABLE II

| Distance from Inlet of Catalyst Bed (inches) | Temperature of Bed (°F.) $H_2O/CH_3OH$ molar ratio | |
|---|---|---|
| | 4.5 | 9.0 |
| 0 | 900 | 900 |
| 2 | 820 | 780 |
| 4 | 630 | 650 |
| 6 | 580 | 620 |
| 8 | 550 | 580 |
| 10 | 520 | 550 |
| 12 | 480 | 550 |
| 14 | 450 | 520 |

The gaseous product exiting the reformer was cooled, collected and analyzed with a gas chromatograph (G.C.) during the course of the reforming reaction. The conversion results are summarized in Table III below.

TABLE III

| Run No. | $H_2O/CH_3OH$ Molar Ratio | Run Duration (Hours) | % Conversion of Methanol Initial | % Conversion of Methanol Final | Gaseous Effluent Composition $H_2$ | $CO_2$ | CO | $CH_4$ |
|---|---|---|---|---|---|---|---|---|
| 1 | 4.5 | 4.0 | 84.6 | 84.6 | 80.2 | 19.8 | (1) | 0.0 |
| 2 | 9.0 | 4.0 | 96.2 | 96.2 | 72.75 | 27.25 | (1) | 0.0 |
| Control* | 1.3 | 4.0 | 98.5 | 99.5 | 74.0 | 24.0 | 2.0 | 0.0 |

*Typical results from conventional steam reforming of methanol at 525° F. reactant temperature.
(1)Less than G.C. detection, (100–200 ppm)

EXAMPLE II

An experiment was conducted with a shell and tube type reactor in which the catalyst was divided into two sections. The first section extended six inches from the inlet of the 13 reactor tubes. The second catalyst section extended the remaining 18 inches of the tubes to the outlet. The first section contained a low activity, high temperature resistant catalyst consisting of 978.0 grams of a zinc-chromium oxide catalyst composed of 55.0% by weight Zn, and 22.0% by weight chromium oxide. The second catalyst section contained 5884.0 grams of a high activity, low temperature catalyst consisting of ZnO/CuO combination with an alumina support; the catalyst comprised 11.6% by weight Zn, 27.5% by weight Cu, and 29.9% by weight alumina and was of the type conventionally used for the water-gas shift reaction.

The water/methanol feedstock molar ratio was 2.0. Effluent samples collected from condenser 20 and analyzed for CO level indicated a concentration varying from 0.5 to 2.0 weight percent. The methanol conversion was 99.5%. The first order rate constant was 2.44 gm methanol feed/gm catalyst/hour. The weight hourly space velocity was 0.46 gm methanol feed/gm catalyst/hour.

The temperature profile through the length of the reformer is shown in Table IV below. This illustrates the effect of the upper, high temperature catalyst section in protecting the lower, low temperature catalyst from the high inlet temperatures necessary to complete the reaction with an optimally sized reactor.

TABLE IV

| Distance from Inlet of Catalyst Bed (inches) | Temperature of Bed (°F.) |
|---|---|
| First Section | |
| 0.0 | 800.0 |
| 0.25 | 600.0 |
| 1.5 | 510.0 |
| 3.0 | 500.0 |
| Second Section | |
| 4.0 | 410.0 |
| 12.0 | 425.0 |
| 18.0 | 440.0 |
| 26.0 | 458.0 |

The conversion results are summarized in Table V below.

TABLE V

| % Conversion of Methanol | | Gaseous Effluent Composition (Mole %) | | | |
|---|---|---|---|---|---|
| Initial | Final | $H_2$ | $CO_2$ | CO | $CH_4$ |
| 98.5 | 99.5 | 74.75 | 24.24 | 1.01 | 0.0 |

While specific components of the present system are defined in the working examples above, many other variables may be introduced which may in any way affect, enhance or otherwise improve the present invention. These are intended to be included herein.

While specific components of the present system are defined in the working examples above, many other variables may be introduced which may in any way affect, enhance or otherwise improve the present invention. These are intended to be included herein.

Although variations are shown in the present application, many modifications and ramifications may occur to those skilled in the art upon reading the present disclosure. These, too, are intended to be included herein.

We claim:

1. A process of providing a continuous supply of hydrogen fuel to a fuel cell system, the system being comprised of a heat exchanger, a burner, a catalytic reactor containing a catalyst bed for catalyzing the production of hydrogen from a gaseous mixture of water and methanol and a fuel cell comprised of a fuel electrode, an oxygen electrode and an electrolyte disposed therebetween, the process comprising the steps of:
    (a) passing a gaseous mixture consisting essentially of water and methanol to the heat exchanger to heat the mixture to a superheated state, the temperature and composition of the superheated mixture being sufficient to supply at least about 90% of the heat required for reforming the methanol contained in said mixture by condensation,
    (b) passing the superheated gaseous mixture of water and methanol into the catalytic reactor to form hydrogen by an endothermic reaction of water and methanol over the catalyst bed, the catalytic reactor being in the form of a tube having a length to diameter ratio of from about 2 to about 6, said catalyst bed comprising a low activity, high stability zinc oxide and chromium oxide catalyst comprised of about 30 to 65 percent by weight Zn and about 5 to 35 percent by weight Cr, followed by a high activity zinc oxide and copper oxide catalyst on alumina comprised of about 5 to 20 percent by weight Zn, about 15 to 40 percent by weight Cu, and about 15 to 50 percent by weight alumina, the temperature of said superheated mixture being between about 425° and about 600° C. and the water to methanol ratio being between about 2 and about 9,
    (c) directing hydrogen produced in step (b) to the fuel electrode of the fuel cell,
    (d) directing air into the oxygen electrode of the fuel cell to effect an electrochemical reaction to produce electricity,
    (e) exhausting the gaseous effluent from the fuel electrode, a portion of which is a combustible gas, burning the combustible portion of the fuel electrode exhaust in the burner, feeding the burner exhaust to the heat exchanger to supply heat for the superheating of the water and methanol in step (a) whereby the gases exhausted from the fuel electrode supply at least a major portion of the thermal energy, via combustion, to heat the water/methanol mixture to the superheated state.

2. A process of providing a continuous supply of hydrogen fuel to a fuel cell system, the system being comprised of a heat exchanger, a burner, a catalytic reactor containing a catalyst bed for catalyzing the production of hydrogen from a gaseous mixture consisting essentially of water and methanol and a fuel cell comprised of a fuel electrode, an oxygen electrode and an electrolyte disposed therebetween, the process comprising the steps of:
    (a) passing a gaseous mixture of water and methanol to the heat exchanger to heat the mixture to a superheated state, the temperature and composition of the superheated mixture being sufficient to supply at least about 75% of heat required for reforming the methanol contained in said mixture by condensation,
    (b) passing the superheated gaseous mixture of water and methanol into the catalytic reactor to form hydrogen by an endothermic reaction of water and methanol over the catalyst bed, the catalytic reactor being in the form of a simple tube having a length to diameter ratio of less than about 10 to 1,
    (c) directing hydrogen produced in step (b) to the fuel electrode of the fuel cell,
    (d) directing air into the oxygen electrode of the fuel cell to effect an electrochemical reaction to produce electricity,
    (e) exhausting the gaseous effluent from the fuel electrode, a portion of which is a combustible gas, burning the combustible portion of the fuel electrode exhaust in the burner, feeding the burner exhaust to the heat exchanger to supply heat for the superheating of the water and methanol in step (a) whereby the gases exhausted from the fuel electrode supply the thermal energy, via combustion, to heat the water/methanol mixture to the superheated state.

3. The process of claim 2 wherein a portion of the catalytic reactor exhaust is comprised of water which is condensed and recycled for use in the catalytic steam reforming reaction.

4. The process of claim 2 wherein the water/methanol mixture is superheated to a temperature between about 800° and about 1100° F.

5. The process of claim 2 wherein the water/methanol mixture is superheated to a temperature of about 850° to about 1000° F.

6. The process of claim 2 wherein the water/methanol molar ratio in the superheated gaseous mixture is between about 2 to about 9.

7. The process of claim 2 wherein the fuel cell electrolyte is phosphoric acid.

8. The process of claim 2 wherein the catalyst in the catalyst bed is a combination of zinc and chromium oxides on alumina.

9. The process of claim 2 wherein the catalyst bed comprises a low activity, high stability zinc oxide and chromium oxide catalyst comprised of about 40 to 65 percent by weight Zn and about 10 to 30 percent by weight Cr, followed by a high activity zinc oxide and copper oxide catalyst on alumina comprised of about 5 to 20 percent by weight Zn, about 20 to 35 percent by weight Cu, and about 20 to 40 percent by weight alumina.

10. A process of providing a continuous supply of hydrogen fuel to a fuel cell system, the system being comprised of a heat exchanger, a burner, a catalytic reactor containing a catalyst bed for catalyzing the production of hydrogen from a gaseous mixture consisting essentially of water and methannol and a fuel cell comprised of a fuel electrode, an oxygen electrode and an electrolyte disposed therebetween, the process comprising the steps of:
  (a) passing a gaseous mixture of water and methanol to the heat exchanger to heat the mixture to a superheated state,
  (b) passing the superheated gaseous mixture of water and methanol into the catalytic reactor to form hydrogen by an endothermic reaction of water and methanol over the catalyst bed, the degree of superheat provided in step (a) supplying a major portion of the endothermic heat of reaction required therefor,
  (c) directing hydrogen produced in step (b) to the fuel electrode of the fuel cell,
  (d) directing air into the oxygen electrode of the fuel cell to effect an electrochemical reaction to produce electricity,
  (e) exhausting the gaseous effluent from the fuel electrode, a portion of which is a combustible gas, burning the combustible portion of the fuel electrode exhaust in the burner, feeding the burner exhaust to the heat exchanger to supply heat for the superheating of the water and methanol in step (a) whereby the gases exhausted from the fuel electrode supply the thermal energy, via combustion, to heat the water/methanol mixture to the superheated state.

11. The process of claim 10 wherein a portion of the catalytic reactor exhaust is comprised of water which is condensed and recycled for use in the catalytic steam reforming reaction.

12. The process of claim 10 wherein the water/methanol mixture is superheated to a temperature between about 800° and about 1100° F.

13. The process of claim 10 wherein the water/methanol mixture is superheated to a temperature of about 850° to about 1000° F.

14. The process of claim 10 wherein the water/methanol molar ratio in the superheated gaseous mixture is between about 2 to about 9.

15. The process of claim 10 wherein the fuel cell electrolyte is phosphoric acid.

16. The process of claim 10 wherein the catalyst in the catalyst bed is a combination of zinc and chromium oxides on alumina.

17. The process of claim 10 wherein the catalyst bed comprises a low activity, high stability zinc oxide and chromium oxide catalyst comprised of about 40 to 65 percent by weight Zn and about 10 to 30 percent by weight Cr, followed by a high activity zinc oxide and copper oxide catalyst on alumina comprised of about 5 to 20 percent by weight Zn, about 20 to 35 percent by weight Cu, and about 20 to 40 percent by weight alumina.

* * * * *

UNITED STATES PATENT AND TRADEMARK OFFICE
CERTIFICATE OF CORRECTION

PATENT NO. : 4,670,359

DATED : June 2, 1987

INVENTOR(S) : B. S. Beshty, J. A. Whelan

It is certified that error appears in the above—identified patent and that said Letters Patent is hereby corrected as shown below:

In Column 1, line 6, after the heading "BACKGROUND OF THE INVENTION", please add the following new paragraph: --The Government has rights in this invention pursuant to Contract Number DEN3-241 awarded by the U.S. Department of Energy.--

Signed and Sealed this

Twenty-first Day of March, 1989

Attest:

DONALD J. QUIGG

Attesting Officer

Commissioner of Patents and Trademarks